United States Patent [19]

Shaffer

[11] Patent Number: 4,997,605

[45] Date of Patent: Mar. 5, 1991

[54] ZIRCONIA MULLITE/BORON NITRIDE COMPOSITES

[75] Inventor: Gregory W. Shaffer, Brunswick, Ohio

[73] Assignee: Union Carbide Corporation, Danbury, Conn.

[21] Appl. No.: 425,911

[22] Filed: Oct. 24, 1989

Related U.S. Application Data

[62] Division of Ser. No. 300,976, Jan. 24, 1989, Pat. No. 4,904,626.

[51] Int. Cl.$^5$ ............................................. C04B 35/58
[52] U.S. Cl. ...................................... 264/65; 264/325; 264/332
[58] Field of Search .......................... 501/98, 105, 128; 222/606; 264/65, 332, 325

[56] References Cited

U.S. PATENT DOCUMENTS

| | | | |
|---|---|---|---|
| 4,007,049 | 2/1977 | Rossi et al. | 106/58 |
| 4,106,075 | 8/1978 | Baumann et al. | 361/320 |
| 4,327,187 | 4/1982 | Komatsu et al. | 501/97 |
| 4,495,123 | 1/1985 | Hunold et al. | 264/69 |
| 4,539,300 | 9/1985 | Coblenz | 501/98 |
| 4,568,007 | 2/1986 | Fishler | 222/206 |
| 4,640,899 | 3/1987 | Hillig et al. | 501/5 |

OTHER PUBLICATIONS

Microstructure and Thermomechanical Properties in Alumina-and Mullite-Boron-Nitride Particulate Ceramic-Ceramic Composites, by D. Lewis, et al. Ceram. Eng. Sci. Proc., 2:719-727 (Nos. 7-8, 1981).

Effect of Boron Nitride Addition on Like Properties of Aluminosil Refractories, S. G. Tresvyatskii et al., Institute for Materials Science Research, Academy of Sciences of the Ukrainian SSR. Translated from Ogneupory, No. 4, pp. 36-39, Apr., 1968.

Development and Metallurgical Analysis of the Horizontal Continuous Casting, Yoshio Miyashita, et al., I&SM, Aug. 1981 pp. 22-28.

"Shock Resistance Ceramics", V. M. Grosheva et al. Inst. Probl. Materialoved., Kiev., USSR Steklo Keram. 1970, 27(11), 36-7 (Eng.) Abstract Only.

"Thermally Bonded Fibrous Product", C. A. Hill et al. (Babcock and Wilcox Co.) U.S. U.S. 4,650,775, (Cl. 501-95; Co4B35/02) Mar. 17, 1980 Appl. 857,699, Apr. 29, 1986; 3 pp. Abstract Only.

"Refractory Composite", Karpinos., D. M. et al. "Institute of Problems in Material Management Academy of Sciences", Ukrainian SSR USSR 530,018 Cl C04B35/58, Sep. 30, 1976, Appl. 2, 116,845 Mar. 25, 1975 From Otkrytiya, Izobret., Prob. Tovarnye Znaki 1976 53(36), 50 Abstract Only.

"Charge for the Production of a Composite Material" Karpinos, D. M. et al. Institute of Problems in Material Management, Academy of Sciences, Ukainian SSR USSR 527,406 (Cl C04B35/58), Sep. 5, 1976 Appl. 2,136,747, May 23, 1975 From Otkrytiya, Izobret., Prom. Obraztsy Tovarnye Znaki 1976, 53(36), 50 Abstract Only.

"Charge for Preparing Refractory Material", Gaiova, T. I. et al. Institute of Problems of Material Management, Academy of Sciences Ukainian SSR USSR 268,971 (Cl. C04b), Apr. 10, 1970, Appl. 22 Jul. 1968, From Otkrytiya, Izobret., Prom. Obraztssy, Tovarnye Znaki 1970, 47(14), 152 Abstract Only.

*Primary Examiner*—James Derrington
*Attorney, Agent, or Firm*—Cornelius F. O'Brien

[57] ABSTRACT

A hot-pressed ceramic composite having good resistance to thermal shock and good erosion/corrosion resistance in molten alloys, and a method for producing said composite which comprises the blending of fused zirconia mullite with boron nitride.

3 Claims, No Drawings

ZIRCONIA MULLITE/BORON NITRIDE COMPOSITES

This application is a Division of Ser. No. 300,976, filed Jan. 24, 1989, now U.S. Pat. No. 4,904,626.

FIELD OF THE INVENTION

The invention relates to ceramic composites and a method of making ceramic composites having good erosion and corrosion resistance to molten metals and alloys, and good resistance to thermal shock which comprises the blending of fused zirconia mullite with boron nitride.

BACKGROUND OF THE INVENTION

Ceramic materials are currently being used successfully in a variety of applications, such as for break rings in horizontal continuous casting processes. The horizontal continuous casting process involves extreme environmental conditions such as rapid rises in temperature, and severe temperature gradients. Generally, break rings for use in this type of application would be subjected to extremely fast temperature rises, and high temperature gradients often in excess of 1000° C/cm. These conditions require a material that has good thermal shock resistance to prevent breaking. Additionally, in this type of application, the material should preferably have a high abrasive resistance and corrosion resistance with respect to molten metals, be machinable, and be economical to manufacture.

Boron nitride (BN) is presently being successfully used as a material for break rings due to its good thermal shock resistance, corrosion resistance, stability at high temperature, and machinability. However, it lacks good abrasion resistance, which renders it subject to high wear rates when exposed to flowing metal. Additionally, boron nitride ceramics typically contain a $B_2O_3$ binder phase that can react chemically with molten metals, which further degrades the integrity of the boron nitride ceramic. The degradation of the boron nitride can also cause problems with the metal being cast. Boron nitride particles, as well as bubbles which form from gaseous $B_2O_3$ or $CO_2$ from the reaction of $B_2O_3$ with carbon, can be trapped in the metal as it solidifies.

Alumina ($Al_2O_3$) is also used in molten metal applications due to its hardness, abrasion resistance, and chemical stability. Although satisfactory, alumina ceramics often have poor thermal shock properties, and are difficult to machine because of their hardness. Thus ceramic components have been made with boron nitride and alumina in which the material has the abrasion resistance and chemical stability of the alumina and has the thermal shock resistance and good machinability of the boron nitride.

U.S. Pat. No. 4,007,049 discloses a thermal shock resistant material that has a high degree of resistance to failure by thermal fracture and which comprises a composite of a refractory oxide and flaked boron nitride. The boron nitride flakes are incorporated into a refractory oxide matrix as an inert, nonreactive, uniform dispersed phase in proportions sufficient to provide the oxide composite with an increased resistance to thermal shock.

S. G. Tresvyatskii et al in "Effect of Boron Nitride Addition on Some Properties of Aluminosilicate Refractories" Institute for Materials Science Research, Academy of Sciences of the Ukrainian SSR, No. 4, pp. 36-39, April, 1968 discloses that the thermal shock resistance of aluminosilicate refractories can be increased with an addition of boron nitride.

Lewis et al in "Microstructure and Thermomechanical Properties in Alumina- and Mullite-Boron-Nitride Particulate Ceramic-Ceramic Composites", Ceram. Eng. Sci. Proc., 2:719-727 (Nos. 7-8, 1981) discloses the preparation of $Al_2O_3$-BN and mullite-BN composites and provides data on the thermal shock resistance of such composites An object of the present invention is to provide a new ceramic composite that has improved thermal shock resistance and good erosion/corrosion resistance in high temperature environments.

Another object of the present invention is to provide a new ceramic composite that is suitable for use as a break ring in a horizontal continuous casting process.

Another object of the present invention is to provide a hot pressed ceramic composite comprising a blend of fused zirconia mullite and boron nitride.

The above and further objects and advantages of this invention will become apparent upon consideration of the following detailed description thereof.

SUMMARY OF INVENTION

The invention relates to a hot pressed ceramic composite having good resistance to thermal shock and which comprises a blend of boron nitride and fused zirconia mullite, said fused zirconia mullite comprising from 25 to 45 weight percent zirconia and from 55 to 75 weight percent mullite based on the weight of the fused zirconia mullite, and said ceramic composite comprising from 26 to 90 weight percent boron nitride and from 10 to 74 weight percent fused zirconia mullite based on the weight of the ceramic composite.

Mullite ($3Al_2O_3 \cdot 2SiO_2$) is an orthorhombic homogeneous solid solution of alumina in sillimanite and can be made by heating andalusite, sillimanite or kyanite. Fused zirconia mullite can be prepared by blending a proper proportion of zirconia with mullite and heating the blend to a temperature sufficient to melt the blend followed by cooling to form a solidified mass.

The solidified mass is then crushed to produce a particulate form of the fused zirconia mullite. It is believed that the zirconia is substantially dispersed in the form of rods and/or nodules in the mullite and this arrangement imparts excellent thermal shock resistance and chemical resistance to the material.

In the subject invention, the amount of zirconia and mullite in the fused zirconia mullite can be from 25 to 45 weight percent zirconia and 55 to 75 weight percent mullite, preferably from 30 to 37 weight percent zirconia and 63 to 70 weight percent mullite, and more preferably about 37 weight percent zirconia and about 63 weight percent mullite. An amount of zirconia below 25 weight percent would be insufficient to impart effective chemical and thermal shock resistance to the composite while it is believed that an amount above 45 weight percent would impart brittleness to the material.

In accordance with this invention, the amount of fused zirconia mullite and boron nitride in the ceramic composite can be from 10 to 74 weight percent fused zirconia mullite and from 26 to 90 weight percent boron nitride, preferably from 40 to 72 weight percent fused zirconia mullite and from 28 to 60 weight percent boron nitride, and more preferably from 50 to 70 weight percent fused zirconia mullite and from 30 to 50 weight percent boron nitride. An amount of fused zirconia mullite above 74 weight percent would render the composite too brittle while an amount of fused zirconia mullite below 10 weight percent would not effectively improve the erosion/corrosion characteristics of the composite.

In some applications it is preferable to have the purity of the boron nitride not less than 99 weight percent, and more preferably not less than 99.5 weight percent boron nitride. The purity refers mainly to the absence of impurities which form liquids or react to form liquids at the processing temperature. For example, the impurity of boron oxide in boron nitride can form a glassy grain boundary phase during processing which could result in the ceramic composite being severely eroded/corroded in molten alloys. Non-liquid forming impurities may be present in larger amounts without effecting the overall characteristics of the ceramic composite.

Another aspect of the invention is a method for producing a hot pressed ceramic composite which comprises:

(a) blending a mixture comprising from 10 to 74 weight percent particulate fused zirconia mullite and 26 to 90 weight percent particulate boron nitride;

(b) heating and compressing the blended mixture in a mold under an inert atmosphere at a temperature between about 1680° C. and about 1710° C. at a pressure between about 1800 and 2500 pounds per square inch for a time period until the composite stops shrinking; and (c) cooling the composite.

As used herein an inert atmosphere is a vacuum or an atmosphere composed of an inert gas such as argon, nitrogen or the like.

Preferably this particulate fused zirconia mullite should be sized between about 0.1 and 75 microns and preferably between about 2 and about 45 microns. The particulate boron nitride should be sized between about 0.1 and 45 microns and preferably between about 1 and about 25 microns. The particulate components should be blended to form a substantially homogeneous mixture in a conventional type blender or mixer such as double cone blenders, twin shell or V-blenders, drum blenders, and the like.

The blended mixture is then heated at a temperature between about 1680° C. and 1710° C., preferably between about 1690° C. and 1705° C. at a pressure between about 1800 and 2500 psi, preferably between about 2100 at 2300 psi.

The temperature and pressure selected should be sufficient to form the ceramic composite but below the temperature that the mixture would melt. The time period for the hot pressing step should be continued until the ceramic composites effectively or substantially stop shrinking.

Hot isostatic compression could be used in which there is no one direction of compression, and the composite produced will be isotropic. The compression and heating step should be performed in a non-oxidizing atmosphere with respect to the blended mixture. A suitable non-oxidizing atmosphere may be provided by a vacuum, or an atmosphere of a non-oxidizing gas such as an inert as such as argon, nitrogen, or the like. In an oxidizing atmosphere, such as air, the boron nitride could oxidize to form a $B_2O_3$ phase, which is in a liquid phase during heating. This impurity could result in an inferior composite with respect to erosion/corrosion in molten alloys.

After the ceramic composite has effectively stopped shrinking, the composite is cooled and machined to appropriate sizes and shapes for its particular application.

Whether conventional hot uniaxial pressing techniques or isotatic hot pressing techniques are employed the composite produced can be machined in any direction.

The ceramic composite of this invention is ideally suited for use as break rings in horizontal continuous casting processes, crucibles, on atomization nozzles, dies and welding nozzles.

The following examples are intended to illustrate the invention, and are not intended to limit the scope of the present invention in any manner.

The fused zirconia mullite used in the examples was obtained from Keith Refractories of Great Britain under the trade name K-Ref Fused Zirconia Mullite 36. The fused zirconia mullite had a particle size of 200 Tyler mesh (−75 microns) and was composed of about 62 8 weight percent mullite, about 36.9 weight percent zirconia with a minor amount of $H_fO_2$, and remained minor amounts of various oxides and free iron.

The boron nitride used in the examples was obtained from Union Carbide Corporation, a New York Corporation under the trade name UCC Grade HCP Boron Nitride. This boron nitride was temperature purified to 1900° C. to reduce any $B_2O_3$ to less than 0.5 weight percent and with less than 0.5 weight percent lattice oxygen (measured as $O_2$). The boron nitride had a surface area of 10 to 15 $m^2/gm$ and a particle size in which 94.5% passed through a 325 Tyler mesh (−45 microns).

EXAMPLE I

Various amounts of boron nitride and fused zirconia mullite were mixed for about two hours with a twin shell V-blender with an intensifier bar. The blended materials were then prepressed into fine-grain graphite molds each having an inside diameter of 2.0 inches (5cm), an outside diameter of 3.75 inches (9.5 cm) and a length of 18 inches (45 7 cm). Each mold was lined with a layer of Grafoil (Trade Mark of Union Carbide Corporation for flexible graphite) to keep the composite from sticking to the mold when processed.

The molds and contents were loaded into a 4 inch (10cm) diameter resistance heated tube furnace, and heated for two hours at various temperatures under a pressure of 2200 psi provided by a hydraulic ram in a nitrogen atmosphere. The heating and pressurizing rates were 330° C./hr and 500 psi/hr, respectively. The molds were allowed to cool and then two-inch diameter billets were removed from the molds. The amounts of the blend, proportions of the blend, and temperature of the heating step for each sample billet produced are shown in Table 1. In addition, for comparison, a boron nitride billet was produced in a similar manner at a temperature of 1775° C. as shown in Table 1.

Sample bars were cut from each billet parallel to the pressing direction and then the percent theoretical density was obtained for each sample. The data obtained are shown in Table 1. A sample bar from each billet measuring 0.75 inch (1.9 cm) diameter by 3 inches (7.6 cm) long was rotated at 60 revolutions per minute (rpm) in molten 304 stainless steel at a temperature of 1575° C.

for four hours. The reduction in the diameter of each sample was then measured as a percent reduction per hour and the data obtained are shown in Table 1. On all samples except Sample No. 1, a reaction layer was observed. It is postulated that this reaction layer protects the composite from further degradation. This reaction layer is believed to be $Al_2O_3$ and $ZrO_2$. The reduction in the diameter of the sample is an indication to the erosion/corrosion resistance characteristics of the sample.

A sample bar from each billet was subject to a thermal shock test which consisted of dunking a room-temperature sample bar measuring 0.75 inch (1.9 cm) diameter by 3 inches (7.6 cm) long into a 1575° C. stainless steel melt and then air quenching. The visual results observed are shown in Table 1.

As can be seen in Table 1, a 50/50 weight percent composite of zirconia mullite and boron nitride possesses equivalent thermal shock resistance to plain boron nitride and significantly improved erosion/corrosion resistance (Compare Sample 1 with Samples 3, 5, 15 and 16).

(CTE), Rockwell R hardness and sonic modulus were measured for each of the sample bars.

The flexural strengths, at 1500° C., and at room temperature, were determined using the ASTM D-690 three point loading method.

The sonic modulus for each sample bar was determined using the sonic resonance technique as disclosed in ASTM C747-74.

The CTE was measured by placing the sample bar on support pins and inserting lengthwise into a graphite tube furnace. An optical extensometer was used which comprised two parallel telescopic sights mounted so that the distance between the axis of the sights could be adjusted. A caliper was used to measure the distance between the sights. The sights were focused on the ends of the sample bar through the sight tubes in the furnace. The furnace was heated under an inert atmosphere, and at appropriate temperature intervals the length of the sample was measured with the caliper. The CTE was calculated as the fractional change of the length of the sample divided by the rise in temperature in degrees centigrade.

TABLE I

| Sample | w/o $ZrO_2$ Mullite | w/o* BN | w/o** BN | Temp. (°C.) | % Theoretical Density | Thermal Shock Test Results | Compatibility Test Results (% Reduction in Diameter/Hour) |
|---|---|---|---|---|---|---|---|
| 1 | 0 | 100 | 0 | 1775 | 90.0 | No Cracking or Spalling | 16.0 |
| 2 | 50 | 50 | 0 | 1640 | 73.3 | Catastrophically Failed | — |
| 3 | 50 | 0 | 50 | 1700 | 90.7 | No Cracking of Spalling | 0.065 (w/Reaction Layer Attached) |
| 4 | 50 | 0 | 50 | 1740 | 84.7 (Temperature too High; Billet Bonded to Mold) | — | — |
| 5 | 50 | 50 | 0 | 1700 | 92.0 (Slight Bonding to Mold) | No Cracking or Spalling | 0.330 (w/Reaction Layer Attached) |
| 6 | 50 | 0 | 50 | 1640 | 76.7 | Catastrophically Failed | — |
| 7 | 90 | 10 | 0 | 1700 | — (Complete Melting) | — | — |
| 8 | 90 | 0 | 10 | 1640 | 98.0 | Too Hard to Machine | — |
| 9 | 75 | 0 | 25 | 1675 | 88.8 | Slight Cracking | — |
| 10 | 75 | 0 | 25 | 1640 | 88.1 | No Cracking or Spalling | 0.64 (w/o Reaction Layer Attached) |
| 11 | 75 | 12.5 | 12.5 | 1700 | 92.9 (melting) | No Cracking or Spalling | — |
| 12 | 75 | 25 | 0 | 1640 | 86.9 | Catastrophically Failed | — |
| 13 | 50 | 0 | 50 | 1700 | 82.9 | — | — |
| 14 | 50 | 0 | 50 | 1705 | 90.3 | — | — |
| 15 | 50 | 0 | 50 | 1710 | 90.9 | — | 1.67 (w/o Reaction Layer Attached) |
| 16 | 50 | 50 | 0 | 1710 | 88.4 | — | 0.94 (w/o Reaction Layer Attached) |
| 17 | 50 | 50 | 0 | 1705 | 86.4 | — | — |
| 18 | 60 | 0 | 40 | 1645 | 78.6 | No Cracking or Spalling | — |
| 19 | 60 | 0 | 40 | 1710 | 92.0 (Slight Melting) | No Cracking or Spalling | — |
| 20 | 60 | 0 | 40 | 1690 | 91.0 (Slight Melting) | No Cracking or Spalling | 1.71 (w/o Reaction Layer Attached) |
| 22 | 60 | 0 | 40 | 1680 | 85.5 | No Cracking or Spalling | — |
| 23 | 60 | 0 | 40 | 1685 | 85.6 | — | — |

*Commerical BN containing relatively high impurities
**Union Carbide Corporation Grade HCP BN that was temperature purified.

EXAMPLE II

Samples 14, 17 and 22 from Example 1 were examined and their properties measured. Specifically, the density, room-temperature flexural strength, 1500° C. flexural strength, coefficient of thermal expansion The data obtained from these tests are shown in Table II.

As evidenced from the data shown in Tables 1 and 2, ceramic composites made in accordance with this invention exhibit high abrasion resistance, high thermal shock resistance, good high temperature strength and will provide longer service life than conventional boron nitride when subjected to molten metal applications.

TABLE II

| Sample (diameter) | Density (g/cm³) | % Theoretical Density | Sonic Modulus × 10⁶ (psi) | Room Temp. Flexural Strength (psi) | 1500° C. Flexural Strength (psi) | Rockwell Hardness (R-Scale) | 1500° C. CTE (in/in/°C.) × 10⁻⁶ | % Permanent Expansion |
| --- | --- | --- | --- | --- | --- | --- | --- | --- |
| 14(2″) | 2.585 | 92.85 | 1.82 | 5,879 | 2,667 | 115.9 | — | — |
| 14(6″) | 2.431 | 87.30 | 1.49 | 4,386 | 2,652 | 111.0 | 9.17 | 0.112 |
| 17(2″) | 2.395 | 86.03 | 5.73 | 10,254 | 1,517 | 116.5 | — | — |
| 22(2″) | 2.484 | 84.99 | 2.04 | 3,263 | 2,174 | 102.3 | 12.0 | 1.18 |

While this invention has been described with reference to certain specific embodiments and examples, it will be recognized by those skilled in the art that many variations are possible without departing from the scope and spirit of the invention, and that the invention, as described by the claims, is intended to cover all changes and modifications of the invention which do not depart from the spirit of the invention.

What is claimed is:

1. A method for the manufacture of a ceramic composite having good resistance to thermal shock and good erosion/corrosion in molten alloys comprising:
   (a) blending a mixture comprising from 10 to 74 weight percent particulate fused zirconia mullite and from 26 to 90 weight percent particulate boron nitride, wherein said fused zirconia mullite comprises from 25 to 45 weight percent zirconia and from 55 to 75 weight percent mullite based on the weight of the fused zirconia mullite;
   (b) heating and compressing the blended mixture of step (a) in a mold under an inert atmosphere at a temperature between about 1680° C. and about 1710° C. at a pressure between 1800 and 2500 pounds per square inch for a time period until the composite stops shrinkage; and
   (c) cooling the composite.

2. The method of claim 1 wherein in step (a) the blended mixture comprises from 40 to 72 weight percent particulate fused zirconia mullite and from 28 to 60 weight percent particulate boron nitride.

3. The method of claim 1 wherein in step (b) the temperature is between about 1690° C. and 1705° C. and the pressure is between 2100 and 2300 pounds per square inch.

* * * * *

UNITED STATES PATENT AND TRADEMARK OFFICE
CERTIFICATE OF CORRECTION

PATENT NO. : 4,997,605
DATED : March 5, 1991
INVENTOR(S) : Gregory W. Shaffer

It is certified that error appears in the above-identified patent and that said Letters Patent is hereby corrected as shown below:

Column 2, line 40 "($3Al_2O_3.2SiO_2$)" should read ---($3Al_2O_3 \cdot 2SiO_2$)---

Column 3, line 66 "as an inert as" should read ---as an inert gas ---, same line, delete "as" before "such".

Column 3, line 68 "B2O3" should read ---$B_2O_3$---

Column 4, line 24 "62 8" should read ---62.8---

Column 4, line 45 "(45 7 cm)" should read ---(45.7 cm)---

Column 5, line 65 "Samples 14, 17 and 22 from Example 1 were exam-" should be preceded by and read ---Sample bars from Samples 14, 17 and 22 from Example 1 were exam- ---

Table I, column 6, under heading titled Thermal Shock Test Results the third line down, "No Cracking of Spalling" should read ---No Cracking or Spalling---

Signed and Sealed this

Twenty-seventh Day of August, 1991

Attest:

*Attesting Officer*

HARRY F. MANBECK, JR.

*Commissioner of Patents and Trademarks*